No. 649,120. Patented May 8, 1900.
J. N. WILSON.
BAND CUTTER AND FEEDER.
(Application filed Dec. 8, 1899.)
(No Model.) 4 Sheets—Sheet 1.
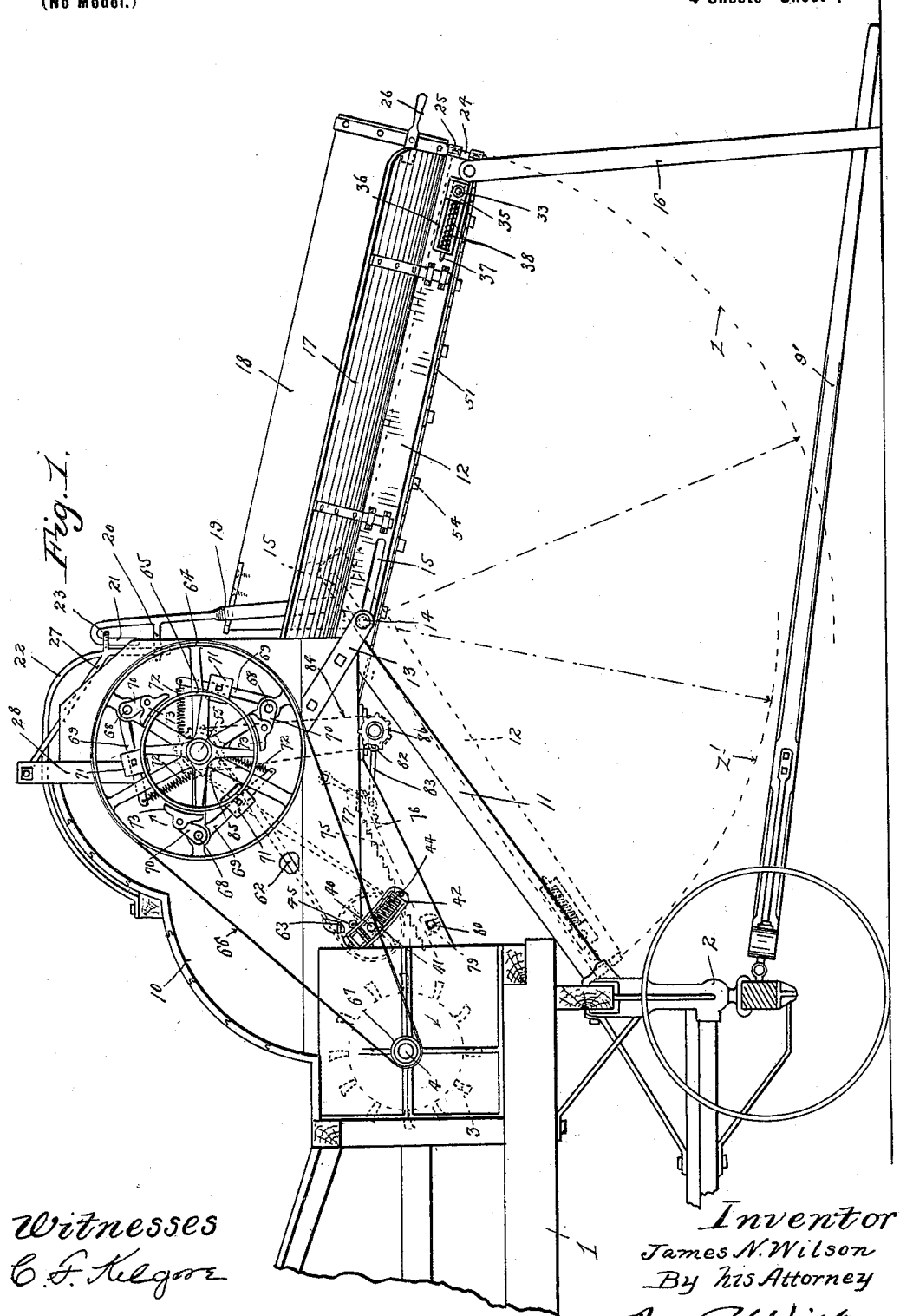

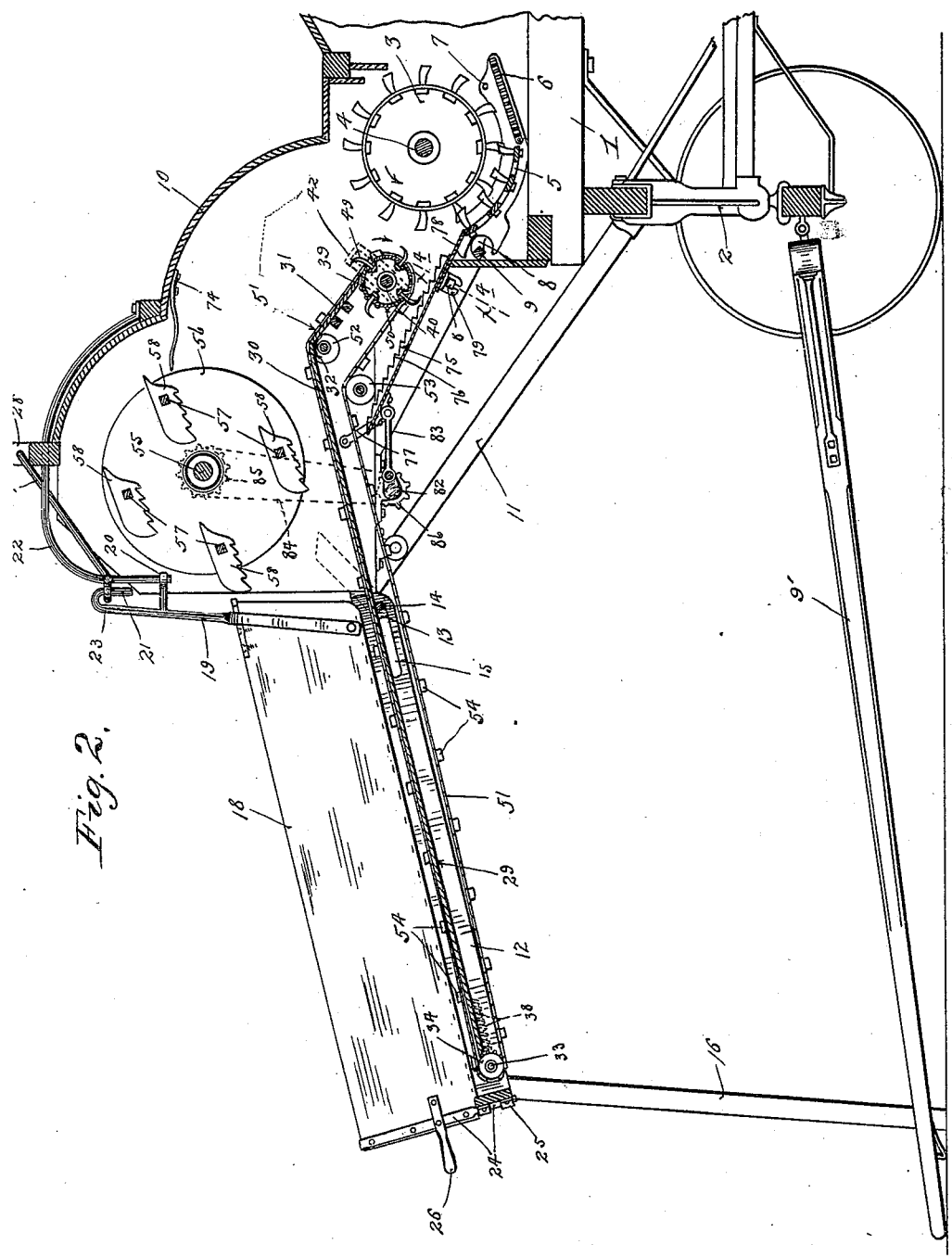

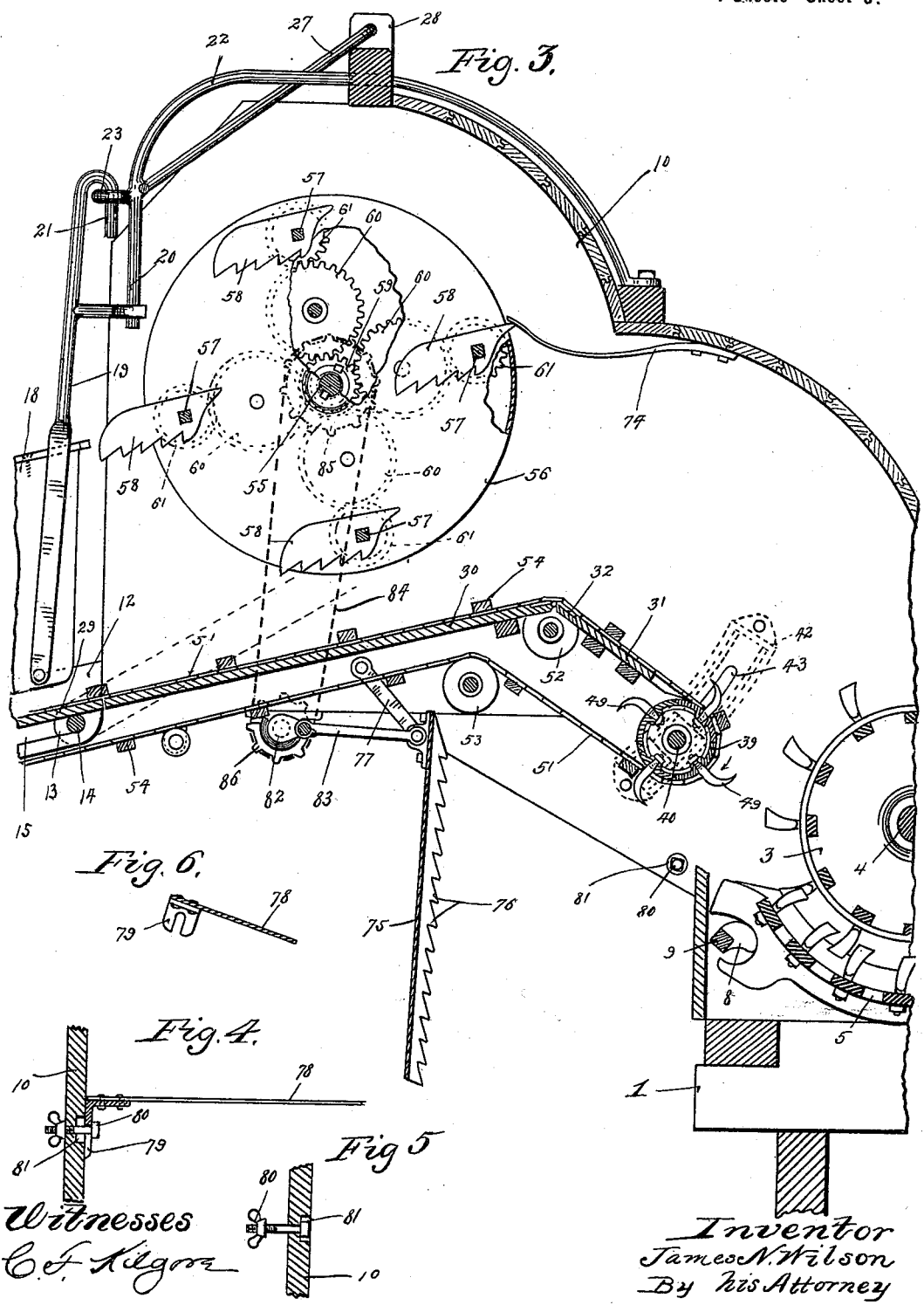

No. 649,120. Patented May 8, 1900.
J. N. WILSON.
BAND CUTTER AND FEEDER.
(Application filed Dec. 8, 1899.)

(No Model.) 4 Sheets—Sheet 4.

Witnesses
C. F. Kilgore
F. D. Merchant

Inventor
James N. Wilson
By his Attorney
Jas. F. Williamson

UNITED STATES PATENT OFFICE.

JAMES N. WILSON, OF CEDAR FALLS, IOWA, ASSIGNOR OF TWO-THIRDS TO GEORGE W. WHITWORTH AND O. H. LEONARD, OF SAME PLACE.

BAND-CUTTER AND FEEDER.

SPECIFICATION forming part of Letters Patent No. 649,120, dated May 8, 1900.

Application filed December 8, 1899. Serial No. 739,603. (No model.)

*To all whom it may concern:*

Be it known that I, JAMES N. WILSON, a citizen of the United States, residing at Cedar Falls, in the county of Black Hawk and State of Iowa, have invented certain new and useful Improvements in Band-Cutters and Feeders; and I do hereby declare the following to be a full, clear, and exact description of the invention, such as will enable others skilled in the art to which it appertains to make and use the same.

My invention relates to band-cutters and feeders, and has for its primary object to secure increased efficiency of action.

Another part of my purpose is to secure a band-cutter and feeder which is of simple construction, comparatively compact and light of weight, and adapted for ready attachment to all kinds of threshing-machines.

To these ends my invention consists of the novel devices and combinations of devices hereinafter described, and defined in the claims.

The invention is illustrated in the accompanying drawings, wherein like notations refer to like parts throughout the several views.

Figure 7:
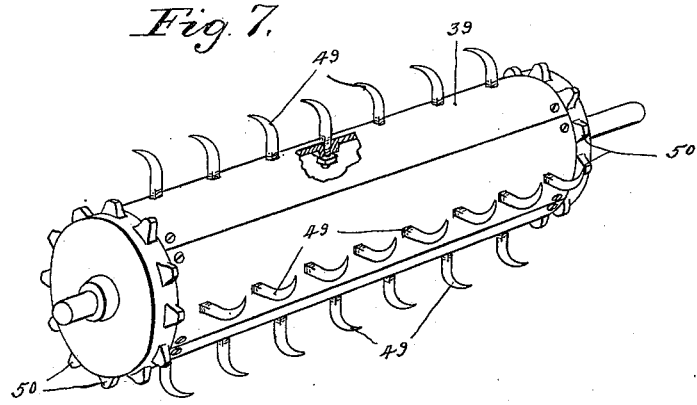
Figure 8:
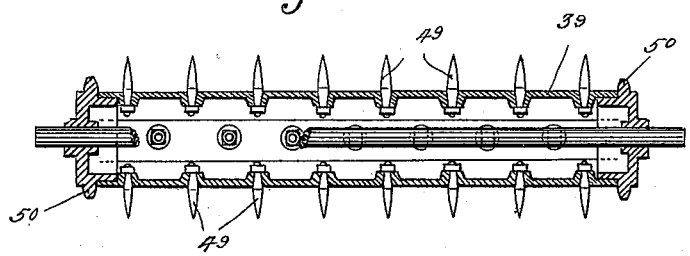
Figure 9:
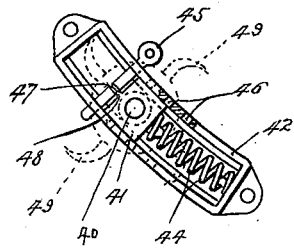

Figure 1 is a view in side elevation, showing my band-cutter and feeder in working relation to a threshing-machine, only the receiving or forward end of the thresher proper being shown. Fig. 2 is a vertical longitudinal section taken centrally through the band-cutter and feeder as shown in Fig. 1 in the same relation to the threshing-machine proper. Fig. 3 is a view corresponding to Fig. 2, but on a much larger scale than Fig. 2, with some parts broken away and other parts shown in a different position than shown in Fig. 2. Fig. 4 is a detail, on an enlarged scale, taken in section on the line $x^4 x^4$ of Fig. 2. Fig. 5 is a view corresponding to Fig. 4, but with some parts removed. Fig. 6 is a detail in vertical section, taken lengthwise of the deck-section 78, which delivers directly to the threshing-cylinder and concave. Fig. 7 is a view in perspective, showing the toothed retarding-cylinder or roller detached. Fig. 8 is a vertical longitudinal section taken centrally through said retarding-cylinder shown in Fig. 7, with some parts broken away and others removed. Fig. 9 is a detail in side elevation, showing the bearings, bearing-guides, &c., for the said retarding-cylinder, which also embraces and supports the delivery end of the feeding-conveyer.

In the trade what has been hereinbefore called the "threshing-machine proper" is ordinarily called a "separator," and for convenience this term will be applied throughout the specification. Of this separator, so far as shown, the numeral 1 represents the frame and the casing; 2, the forward truck; 3, the threshing-cylinder, having its shaft 4 mounted and driven in the ordinary manner by belt from the engine (not shown) running over a pulley (not shown) at the right end of said cylinder. 5 represents the concave; 6, the grating extended rearwardly therefrom; 7, the pivot-rod for the concave and grating; 8, eccentric cams carried by a hand adjustable shaft 9 for adjusting the concave and grating in respect to the cylinder in the customary way. All these parts of the separator are of the ordinary construction.

The band-cutter and feeder is adapted to be detachably secured to the separator in any suitable way.

As shown, the band-cutter and feeder has a main frame or casing 10, which is made fast in any suitable way to the separator and is supported therefrom by diagonal braces 11 or otherwise. When thus secured and supported, this main-frame casing 10 of the band-cutter and feeder is rigid with the separator.

To the main frame 10 of the band cutter and feeder is attached, by a sliding and pivotal joint, the bundle-table 12. As shown, this joint is afforded by a cross-rod 14, extending through metallic straps 13, fixed to the main-frame section 10 and through longitudinal slots 15 in the side plates of the bundle-table 12. In virtue of this sliding and pivotal joint the bundle-table 12 can be folded into its idle or transporting position, as shown in dotted lines in Fig. 1, without striking the draft-pole 9' of the separator. It may first fold on the arc $z$ and then after receiving an upward sliding motion be further folded on the arc $z'$ into its idle position, as shown in Fig. 1 of the drawings. When the bundle-table is in its extended or working position, it is supported at its outer end by pivoted legs 16, which fold against the bundle-table when the latter is to be turned downward and backward into its idle position. The bundle-table has the customary side boards 17 and is also provided with a detachable center or dividing board 18, extending lengthwise thereof, as best shown in Fig. 2. This dividing-board 18 is provided at the forward end with a bracket 19, having a hook end 21 and an eye-arm 20 for detachably securing the inner end of the dividing-board to the main frame 10 of the band-cutter and feeder. As shown, the hook end 21 engages an eye 23 in a rod 22, secured to bracket 28, fixed to the main frame 10, and the eye-arm 20 engages with the lower end of said rod 22, fixed to the main frame 10 and depending downward from the front end of the same. This affords two points of support for the front end of the divider 18, which points of support are spaced apart from each other and prevent any swinging motion or lateral play of the said divider 18 at its inner end. At its outer end said dividing-board 18 is provided with a depending finger 24, which works into keepers 25, fixed to the bundle-table 12, and is also provided with a handle 26 for use in an obvious manner. The rod 22, to which the inner end of the dividing-board 18 is detachably secured, is shown as reinforced by a pair of rods 27, secured to bracket 28, fixed to the main frame 10.

The floor 29 of the bundle-table 12 affords a deck which when the bundle-table is in working position stands in line with a section of the floor in the main casing 10, which has jointed to its inner end by a hinged joint 32 a downturned or inclined floor-section 31, as best shown in Fig. 3. These floor-sections 29, 30, and 31 form a continuous deck, over which travels a feeding endless conveyer of the slat-and-chain type. The chains are marked 51 and the slats 54 in the drawings. Said feeding-conveyer passes over sprockets 34 on the opposite ends of a shaft 33, located near the outer end of the bundle-table 12, and beyond the floor 29 thereof, and at its inner end the said feeding-conveyer embraces a toothed rotary retarder, which, as shown, is in the form of a cylinder 39, having rows of back-turned teeth 49 and headpieces in the form of sprockets 50, fixed to the shaft of said cylinder 39. The chains 51 of said feeding-conveyer embrace the said sprockets 50 on the toothed retarding-cylinder and receive motion therefrom, as will later be more fully noted. The sprocket-shaft 33 at the outer end of the bundle-table is mounted in the customary bearing-boxes 35, which in turn are mounted for sliding movement in guideways 36 in the side plates of the bundle-table and have stems 37, encircled by coiled springs 38, held between the bearing-boxes and the inner ends of the guides for yieldingly holding the said shaft 33 in its outermost position, as desired, for keeping the feeding-conveyer taut. For a like purpose the upper or overrunning fold of the feeding-conveyer passes over a guide-roller 52, located directly under the hinge or joint 32 between the deck-sections 30 and 31, as best shown in Figs. 2 and 3, and the underrunning fold of the feeding-conveyer passes over another guide-roller 53, located forward of the roller 52, as best shown in said Figs. 2 and 3.

The teeth 49 of the retarding-cylinder 39 are arranged in rows and are turned backward or made of slightly hook shape back-turned with respect to the arc of rotation at their tips. The slats 54 of the feeding-conveyer and the rows of teeth 49 on the retarding-cylinder are so spaced and related that said retarding-teeth 49 will rise into the stock carried on the face of the feeding-conveyer between the slats for their retarding action on the stock, and said parts are also so related that when said teeth 49 withdraw from the underrunning fold of the feeding-conveyer they will withdraw directly adjacent to the said slats 54, thereby causing the slats to have a stripping action in respect to the teeth 49 of the retarding-cylinder 39 and preventing the stock from winding about the said retarding-cylinder. Otherwise stated, the fact that the retarding-cylinder 39 is embraced by the delivery end of the feeding-conveyer, with its rows of teeth properly spaced in respect to the spacing of the slats 54 on the feeding-conveyer, enables said retarding-cylinder to have its retarding action on the stock, as desired, and to be at all times kept clean or free from winding, thereby insuring its proper action and preventing the obstructions and interruptions which would occur if the said retarding-cylinder were not embraced by the delivery end of said feeding-conveyer.

The shaft 40 of the retarding-cylinder 39 has its ends extended through the side plates of the casing 10 and mounted in bearing-boxes 41, which in turn are mounted for sliding motion in arc-shaped guides 42, fixed to the said side plates of said frame or casing 10. Within the said guides 42 and underneath the boxes 41 are mounted springs 44, which tend to throw the said boxes and all the parts carried thereby to an uppermost position, which, as shown, may be variably determined by stop-pins 45, passing through any set of perforations 46 in the sides of said guides 42. To prevent accidental displacement of the pins 45, they are notched, as shown at 47, for engagement with knife-edged lugs 48, projecting from the upper surfaces of the boxes 41, all as best shown in Fig. 9. The springs 44 should be made of the requisite strength to hold the retarding-cylinder and the delivery end of the feeding-conveyer in its uppermost position against the fixed stops 45 or the upper ends of the guides 42 against any strain which might be put on the said retarding-cylinder for the proper coöperation with the threshing-cylinder in the threshing action, but should be light enough to yield, if necessary, to prevent breakage of the parts.

By reference to the drawings, especially Figs. 2 and 3, it will be seen that the said retarding-cylinder 39 and the delivery end of the feeding-conveyer are located near to the threshing-cylinder 3, but slightly spaced apart therefrom, and, further, it will be noted that in view of the location of the joint 32 between the deck-sections 30 and 31 and the radius of the arc form of the guides 42 for the boxes 41 the spacing between the retarding-cylinder and the threshing-cylinder may be slightly varied by adjusting the delivery end of the feeding-conveyer upward or downward by moving the stop-pins 45 into different members of the holes 46 in the guides 42. Otherwise stated, by adjusting the retarding-cylinder in the guides 42 its axis may be brought into or out of line with the cylinder-shaft and the deck-section joint 32, thereby slightly decreasing or increasing the spacing between the threshing-cylinder 3 and the retarding-cylinder 39 of the feeder. This is important for insuring the best action on the stock under different conditions or on different kinds of stock.

Directly over the deck-section 30 is mounted an overhanging rotary band-cutter. This band-cutter is of such construction as to afford a series of feathering-blades 58. It is not new, but is of the type known as the "Dorton" band-cutter, which is fully disclosed and claimed in United States Patents No. 506,422, dated October 10, 1893, and No. 482,077, dated September 13, 1893. The actions and the advantages of this type of band-cutter are fully set forth in the said two patents and are also referred to in my own prior United States patent, No. 507,771, dated October 31, 1893. Detailed description of said rotary band-cutter is of course not necessary for the purposes of this case; but as certain parts thereof have been numbered in the drawings their relations will be named. The band-cutter shaft 55 has secured to its opposite ends within the casing 10 suitable gear-cases 56, which are connected near their outer margins by transverse shafts 57, having fixed thereto the band-cutting blades 58, which are of such shape as to afford serrated edges for the cutting action and rearwardly-projecting pointed heels for the clearing action or returning action on the stock which may accumulate behind the band-cutting cylinder. Within each gear-casing 56 the shaft 55 is provided with a gear 59, which mesh with intermediate gears 60, turning on stud-shafts carried with the gear-casing, and which intermediate gears 60 in turn connect the small gears 61, carried on the transverse shafts 57. This is the well-known "sun-and-planet" gearing and under the rotary motion of the band-cutting cylinder will impart a feathering motion to the cutting and clearing blades 58, all as fully set forth in the prior patents above noted.

Directly to the rearward of the band cutting and clearing cylinder are mounted a series of strong spring-fingers 74, which are fixed to the hood portion of the casing 10 at their innermost ends and have their free ends so disposed in respect to the cutting and clearing blades 58 as to pass between the heels of said blades and coöperate therewith to prevent the said heels of said blades from carrying back outward stock under the normal threshing action, but to yield when necessary for permitting the heels of said blades to throw back outward an uncut bundle or matted mass of stock which might be carried in by the band-cutting cylinder or any excess of stock accumulating behind the band-cutter.

Directly under the delivery-section of the feeding-conveyer is mounted a vibrating feed-pan 75, having the customary fish-back cleats 76 running lengthwise of its feeding-surface for serving the customary function of feeding into the separator any fine stock and the grain which may fall thereon from the primary feeding devices. This feed-pan 75 is pivoted at its outer end to a hanger 77, depending from the fixed frame 10, and receives reciprocating motion from pitman 83, connected to a crank-shaft 82, mounted in suitable bearings on the fixed frame 10. The pitman 83 connects to the pan 75 on a common center with the said pan's connection to the hanger 77. Otherwise stated, the arms of the hanger 77 are connected by a common rod at their lower ends, which forms a part of the hanger and serves also as the connection for the pitman 83 and the vibrating feed-pan 75. This form of connection secures both a forward and backward motion to the feed-pan 75 and an upward and downward motion to the same at its head or receiving end. This is effective for insuring the desired feeding action from said pan 75. Moreover, the fact that the pitman and the vibrating pan 75 connect to the cross hanger-rod, which unites the arms of the hanger 77, permits the feed-pan 75 to freely turn down from the position shown in Fig. 2 into the position shown in Fig. 3, thereby affording free access to the cylinder and concave of the separator when so desired.

At its lower or delivery end the pan 75 when in working position rests on a detachable footboard 78, which delivers directly to the cylinder and concave. As shown, this footboard 78 is provided with notched brackets 79, adapted to engage over nutted bolts 80 for securing the same detachably in working position, as best shown in Figs. 2 and 4. The heads of the bolts 80 may be drawn into recesses 81, countersunk in the side boards of the casing 10 for affording clearance for the passage of the brackets 79 of the foot-plates 78 when so desired. The inner end of the board 78 normally rests on the concave 5 and is free to be adjusted therewith. The said board 78 is detached when it is desired to turn the feed-pan 75 from its working position, as shown in Fig. 2, into the position shown in Fig. 3 for access to the cylinder and concave.

As well known to all persons familiar with the requirements of a successful band-cutter and feeder of large capacity, it is desirable to drive the band-cutting and feeding mechanism, or at least the feeding mechanism, through the intermediacy of a governor, which is driven from the threshing-cylinder. Otherwise stated, it is essential that the feeding mechanism at least should only operate when the threshing-cylinder is running at proper speed. The reasons for this are well known and are fully set forth in prior patents hereinbefore noted. In the present instance I drive both the band-cutting and all of the feeding mechanism through a friction clutch-governor which receives motion from the threshing-cylinder and which is of such design that whenever the threshing-cylinder is at proper working velocity the band-cutting and feeding mechanism will be started with a yielding action and whenever the threshing-cylinder loses its proper working velocity the band-cutting and feeding mechanism will automatically stop until the cylinder recovers its proper speed. As shown, I mount on the left end of the band-cutter shaft 55 a loose pulley 64 and concentric therewith a pulley 65, which is made fast to the shaft. The pulley 64 is connected by belt 66 to a pulley 67 on the left end of the threshing-cylinder shaft 4. The loose pulley 64 is therefore kept in constant motion from the threshing-cylinder. Stud-shafts 68 project from the spokes of the loose pulley 64 and have pivoted thereto the arms 69 70. The arms 69 have mounted thereon adjustable weights 71, and the arms 70 carry at their inner ends shoes 73, adapted to grasp the periphery of the pulley 65, which is fixed to the band-cutter shaft 55, as above noted. The free ends of the arms 69 are connected by springs 72 to the hub of the loose pulley 64. This construction affords a centrifugal governor capable of the functions desired. It is obvious that it will grasp and release the pulley 65, fixed to the band-cutter shaft 55, according to the speed of the loose pulley 64. Now all of the parts of the band-cutting and feeding mechanism receive motion directly or indirectly from the band-cutting shaft 55. Hence it is obvious that whenever the band-cutter stops or starts all the other connected mechanism of the band-cutter and feeder will also stop and start. Having regard to this drive from the band-cutter, the right end of the band-cutter shaft 55 has attached thereto a pulley (indicated, but not clearly shown, and hence not lettered) which is connected by a cross-belt 62 to a pulley 63, located on the right end of the shaft 40 of the retarding-cylinder 39, as indicated in Fig. 1 of the drawings. Hence through these connections the retarding-cylinder 39 and the feeding-conveyer embraced thereby and driven by the sprocket-wheels thereon will receive the desired motions and in the desired directions, as indicated by the arrows. The right end of the band-cutter shaft 55 is also provided with a small sprocket 85, which is connected by a link belt 84 with a small sprocket 86 on the crank-shaft 82, which imparts motion to the vibrating feed-pan 75. Hence this vibrating feed-pan will only be operated when the band-cutter is in motion.

All the parts have now been specified, and it is thought that their actions are probably clear from the detailed description. A few words may, however, be of service respecting the general action of the machine as an entirety.

The uncut bundles are of course pitched onto the bundle-table in the customary way. The feeding-conveyer will then carry up the uncut bundles until within reach of the blades 58 of the rotary band-cutter. The underlying deck 30 will afford the necessary base of resistance for the proper action of the band-cutter on the uncut bundles. Under the action of the band-cutter the bands will be cut, and not only so, but in view of the feathering action of the blades 58 the cut bundles will be more or less opened up and more or less split lengthwise of the original bundles, with the top layers shifted inward toward the threshing-cylinder. Otherwise stated, the band-cutter acts not only to cut the bundles, but with an endwise stripping action on the cut bundles shifting forward the upper strata over the lower, thereby thinning the strata on the section of the conveyer between the band-cutter and the threshing-cylinder. This stripping action, started by the band-cutter and feeder, is then continued under the coöperation of the threshing-cylinder 3 of the separator and the retarding-cylinder 39 of the feed mechanism. Otherwise stated, when the strata of stock on the delivery-section of the feeding-conveyer becomes subject to the retarding-teeth 49 of the retarding-cylinder 39 the underlying strata of the stock will be withheld, while the overlying strata will shift forward under the pull from the rapidly-running threshing-cylinder 3. If any of the stock happens to be matted together or tangled up in any way, it will be caught and held by the retarding-fingers, while at the same time it is subject to the teeth of the threshing-cylinder, and this will insure the tearing apart of the tangled stock and the admission of the same to the threshing-cylinder in the best condition for the threshing action, so far as the feeding is concerned. Even if an uncut bundle should by accident pass the band-cutter and not be thrown back forward thereby, but permitted to pass inward to the delivery-section of the feeding-conveyer, it would be cut by the teeth of the retarding-cylinder and held until the band would be broken and the bundle successively stripped under the action of the threshing-cylinder. This assumes, of course, that the springs 44 underlying the boxes 41, which carry the shaft of the retarding-cylinder, are of the proper tension to withstand the necessary strain for such desired action under the cooperation of the retarding-cylinder and threshing-cylinder on such a body of stock.

If there should be an excessive amount of stock drawn in by the band-cutter beyond what was being fed by the feeding-conveyer and the retarding-cylinder, it will tend to accumulate between the threshing-cylinder and the band-cutter until the pointed heels of the feathering-knives 58 of the band-cutter will engage therewith and throw the excess back outward onto the bundle-table in front of the band-cutter in the same way as described in the prior patents hereinbefore mentioned. The difference over the prior patents in respect to this clearing action is the presence of the spring-fingers 74, coöperating with the band-cutter to prevent back throw under normal conditions, but yielding to permit an uncut bundle or other excess to be thrown back outward when necessary.

From the foregoing description it must be obvious that I have provided a band-cutter and feeder of highly-efficient form designed to feed the stock with a successive series of endwise-splitting actions, as is known to be most desirable, and that at the same time I have provided a band-cutter and feeder which is of simple construction, compact in form, and comparatively light in weight. It will of course be understood that the details of the construction might be changed without departing from the spirit of my invention.

It might be noted that the guides 42, which carry the journal-boxes of the retarding-cylinder 39, are formed to an arc which is described by a radius having the band-cutter shaft 55 as its center, and hence the crossed driving-belt 62, which conveys motion from the band-cutter to the retarder and through the latter to the feeding-conveyer, will remain taut in all the adjustments which may be required to the delivery end of said feeding-conveyer. Of course it will be understood that the toothed retarder in its relation to the feeding-conveyer constitutes a highly-efficient feeder which is capable of use on headed or uncut grain without the presence of the band-cutter. In fact it has been so used by me in practice for that class of work.

By actual usage under the most severe conditions—to wit, on threshers of large capacity when crowded to their limit, as is the custom in the hard-wheat belt of the Northwest—I have demonstrated the efficiency of the band-cutter and feeder herein disclosed. All statements herein made as to the action of the parts are based on field experience with working machines constructed as herein described.

What I claim, and desire to secure by Letters Patent of the United States, is as follows:

1. In a feeder, the combination with a feeding-conveyer, of a toothed rotary retarder, embraced by the delivery end of said feeding-conveyer, with the slats of said conveyer and the rows of teeth on said retarder so spaced and related that the retarding-teeth will rise between the slats of the overrunning fold of the conveyer, and into the stock thereon, substantially as and for the purposes set forth.

2. In a feeder, the combination with a feeding-conveyer, of a toothed rotary retarder, embraced by the delivery end of said conveyer, with the slats of said conveyer and the rows of teeth on said retarder so spaced and related that the retarding-teeth will rise between the slats of the overrunning fold of the conveyer into the stock thereon, for their retarding action on the stock, and that said retarding-teeth will withdraw from the underrunning fold of said conveyer adjacent to said slats, whereby the slats strip the teeth and prevent the stock from winding about the retarder, substantially as described.

3. In a band-cutter and feeder, the combination with an overhanging rotary band-cutter having feathering-knives, substantially as described, of a feeding-conveyer underlying said band-cutter and overrunning a deck which affords a base of resistance to the said band-cutter, and a toothed retarding-cylinder having sprockets engaged by the chains of said conveyer at its delivery end, with the slats on said conveyer and the rows of teeth on said retarding-cylinder so spaced and related that said retarding-teeth will rise into the stock between the slats of the conveyer, and will withdraw from the conveyer against the slats, all substantially as and for coöperation with the threshing-cylinder and concave, as set forth.

4. In a feeder, the combination with a feeding-conveyer having a delivery-section which is adjustable to bring the delivery end thereof nearer to or more remote from the threshing-cylinder, of a rotary retarder embraced by the delivery end of said feeding-conveyer, with the slats of the conveyer and the rows of teeth on the retarder spaced and related as described for the retarding and the clearing actions, as stated, and which retarder is mounted for adjustment with the delivery end of said feeding-conveyer relative to the threshing-cylinder, for coöperation with the threshing-cylinder, as described.

5. In a band-cutter and feeder, the combination with a rotary band-cutter, of spring-fingers coöperating therewith to prevent the return of stock under the normal feeding actions, but yielding to permit the return of stock to the front of the band-cutter when desired for throwing back outward uncut bundles or other overaccumulations of stock behind the band-cutter.

6. The combination with the rotary band-cutter having the feathering-knives with pointed heels as described, of the underlying feeding-conveyer and deck-sections disposed substantially as described, the toothed retarding-cylinder having sprockets embraced by the chains of said conveyer with the slats of the conveyer and the teeth of the retarder spaced and related as described, and both the delivery end of the conveyer and the retarder adjustable together to vary the distance between the retarder and the threshing-cylinder, and the spring-fingers 74 coöperating with the feathering-knives of the band-cutter, substantially as described.

In testimony whereof I affix my signature in presence of two witnesses.

JAMES N. WILSON.

Witnesses:
O. H. LEONARD,
H. W. JOHNSON.